United States Patent
Pabalate (10) Patent No.: US 11,260,785 B1
(45) Date of Patent: Mar. 1, 2022

(54) VEHICLE CUP HOLDER ASSEMBLY

(71) Applicant: Ford Global Technologies, LLC, Dearborn, MI (US)

(72) Inventor: Nathan Pabalate, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/240,043

(22) Filed: Apr. 26, 2021

(51) Int. Cl.
*B60N 3/10* (2006.01)

(52) U.S. Cl.
CPC ............. *B60N 3/102* (2013.01); *B60N 3/106* (2013.01)

(58) Field of Classification Search
CPC ................................ B60N 3/102; B60N 3/106
See application file for complete search history.

(56) References Cited

U.S. PATENT DOCUMENTS

| | | | |
|---|---|---|---|
| 5,673,891 A | 10/1997 | Fujihara et al. | |
| 5,779,302 A * | 7/1998 | Geier ..................... | B60N 3/102 297/188.17 |
| 5,876,007 A | 3/1999 | Lancaster et al. | |
| 5,897,089 A | 4/1999 | Lancaster et al. | |
| 6,817,584 B2 * | 11/2004 | Ogura ................ | A47G 23/0208 224/926 |
| 7,121,517 B2 * | 10/2006 | Oana ...................... | B60N 3/102 248/311.2 |
| 9,845,037 B2 * | 12/2017 | Bohlke .................. | B60N 3/102 |
| 10,850,849 B2 | 12/2020 | Green et al. | |
| 2003/0042382 A1 * | 3/2003 | Shirase .................. | B60N 3/102 248/311.2 |
| 2006/0237499 A1 | 10/2006 | Teichrieb | |
| 2010/0276465 A1 * | 11/2010 | Ercolano ................ | B60N 3/108 224/281 |
| 2014/0191529 A1 * | 7/2014 | Okuhara ................ | B60N 3/102 296/37.15 |
| 2020/0130602 A1 * | 4/2020 | Tena Han ............... | B60R 11/02 |

\* cited by examiner

*Primary Examiner* — Anita M King
(74) *Attorney, Agent, or Firm* — Vichit Chea; Price Heneveld LLP (57) ABSTRACT

A vehicle cup holder assembly that includes a body, and a housing that is wrapped around a corner periphery of the body. A support panel is slideably coupled to the housing and includes a first member and a second member. The support panel is operable between a recessed position and a deployed position, wherein the support panel is configured to receive a container in the deployed position. A lever arm is coupled to the support panel, wherein the lever arm is movable between a retracted position and an extended position, wherein the lever arm is configured to support a base of the container in the extended position, and wherein the lever arm is stored within the side portion of the housing in the retracted position.

20 Claims, 12 Drawing Sheets

VEHICLE CUP HOLDER ASSEMBLY

FIELD OF THE DISCLOSURE

The present disclosure generally relates to a cup holder assembly, in particular a retractable cup holder assembly that is used in a vehicle.

BACKGROUND OF THE DISCLOSURE

Cup holder assemblies are commonly employed on motor vehicles. Some vehicle cup holder assemblies may be movable, wherein they are typically movable between a recessed position when not in use and an extended position when in use. When in the recessed position, such vehicle cup holder assemblies are typically stored within a housing. The housing is typically centrally located within an exterior member, such as an arm rest, and encompasses the space inside of the exterior member. However, such use of the interior space by a vehicle cup holder prevents an alternative use for the interior space.

SUMMARY OF THE DISCLOSURE

According to one aspect of the present disclosure, the present invention relates to a vehicle cup holder assembly that includes a body, a housing, a support panel, and a lever arm. The housing is wrapped around a corner periphery of the body and is comprised of a side portion and a front portion. The support panel is slideably coupled to the housing, and has a first member and a second member. The support panel is operable between a recessed position and a deployed position, wherein the support panel is stored in the housing in the recessed position, and wherein the support panel is configured to receive a container in the deployed position. The lever arm is coupled to the support panel is movable between a retracted position and an extended position. In the extended position, the lever arm is configured to support the base of a container, and in the retracted position, the lever arm is stored within the side portion of the housing.

Embodiments of this aspect and/or the other aspects of the disclosure can include any one or a combination of the following features:
- a finger support rotationally coupled to the second member of the support panel, wherein the finger support is configured to extend generally outward from the second member of the support panel and generally toward the housing, and wherein the finger support is configured to laterally support a container;
- the finger support has a top surface and an angled surface, wherein the top surface is proximate the support panel second member and the angled surface is distal the support panel second member, and wherein the angled surface is configured to contact the front portion of the housing when the support panel is translated to the recessed position;
- the lever arm is rotationally coupled to the support panel;
- a ramp is integrally formed in the housing and extends generally outward from the front portion of the housing;
- the lever arm is configured to rotate generally downward from a first rotational position to a second rotational position when translated to the extended position, wherein the lever arm is configured to be in contact with the ramp when in the second rotational position;
- the lever arm further comprises a rear element, wherein the rear element is semi-circular, and wherein the rear element is configured to form a contact with the housing when the lever arm is in the second rotational position, and wherein the contact provides a retaining force that at least partially keeps the support panel in the deployed position;
- the outside periphery of the housing corresponds with the corner periphery of the body;
- the intersection of the first member of the support panel the second member of the support panel define a corner, wherein the corner, first member, and second member of the support panel generally correspond with the housing outside periphery when the support panel is in the recessed position;
- the corner periphery of the body is a corner periphery of a vehicle arm rest;
- the corner periphery of the vehicle arm rest is configured to be located at an at least forward or rearward position of the vehicle arm rest;
- the housing further comprises an integrally formed slot, and the support panel comprises an integrally formed cylindrical stop that extends generally outward from the first member of the support panel, wherein the cylindrical stop is configured to contact the integrally formed slot and slide along the integrally formed slot when the support panel is translated to the deployed position;
- the contact between the integrally formed slot and the integrally formed cylindrical stop provides a force that at least partially keeps the support panel in the deployed position;
- a cam path defined within a side portion of the housing, and an engagement member integrally formed from the first member of the support panel, wherein the engagement member is configured to form a contact with and slide along the cam path, and wherein the contact between the engagement member and the cam path provides a retaining force that at least partially keeps the support panel in the deployed position; and
- the support panel generally defines an L-shape.

According to another aspect of the present disclosure, the present invention relates to a vehicle cup holder assembly that includes a vehicle arm rest, a housing, a support panel, a lever arm, and a finger support. The housing is wrapped around a corner periphery located at an at least forward or rearward position of a vehicle arm rest. The housing further comprises a side portion and a front portion that define an outside periphery, wherein the outside periphery generally corresponds with the corner periphery of the vehicle arm rest. The support panel is slideably coupled to the housing and further comprises a first member, a second member, and a corner defined by the intersection of the first member and second member. The support panel is operable between a recessed position and a deployed position, wherein the support panel is configured to receive a container in the deployed position, and wherein the first member, second member, and corner of the support panel generally correspond with the housing outside periphery when in the support panel is in the recessed position. The lever arm is coupled to the housing and is movable between a retracted position and an extended position, wherein the lever arm is configured to support a base of the container when in the extended position, and wherein the lever arm is stored within the side portion of the housing when in the retracted position. The finger support is coupled to the second member of the support panel and extends generally outward from the second member of the support panel and generally toward the housing, wherein the finger support is configured to laterally support the container.

Embodiments of this aspect and/or the other aspects of the disclosure can include any one or a combination of the following features:

- a ramp integrally formed in the housing and extending outward from the front portion of the housing, wherein the ramp is configured to be in contact with the lever arm when the lever arm is in the extended position;
- a rear element of the lever arm, wherein the rear element is semi-circular and is configured to form a contact with the housing when the lever arm is in the extended position, and wherein the contact provides a retaining force that at least partially keeps the support panel in the deployed position;
- the housing further comprises an integrally formed slot, and the support panel further comprises an integrally formed cylindrical stop that extends generally outward from the first member of the support panel and is configured to form a contact with the integrally formed slot and slide along the integrally formed slot when the support panel transitions to the deployed position; and
- a cam path defined within the side portion of the housing, and an engagement member integrally formed from the first member of the support panel, wherein the engagement member is configured to form a contact and slide along the cam path when the support panel is translated out to the deployed position, and wherein the contact provides a retaining force that at least partially keeps the support panel in the deployed position.

These and other aspects, objects, and features of the present disclosure will be understood and appreciated by those skilled in the art upon studying the following specification, claims, and appended drawings.

DETAILED DESCRIPTION OF THE DISCLOSURE

The present illustrated embodiments reside primarily in combinations of method steps and apparatus components related to a vehicle cup holder assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Figure 1:
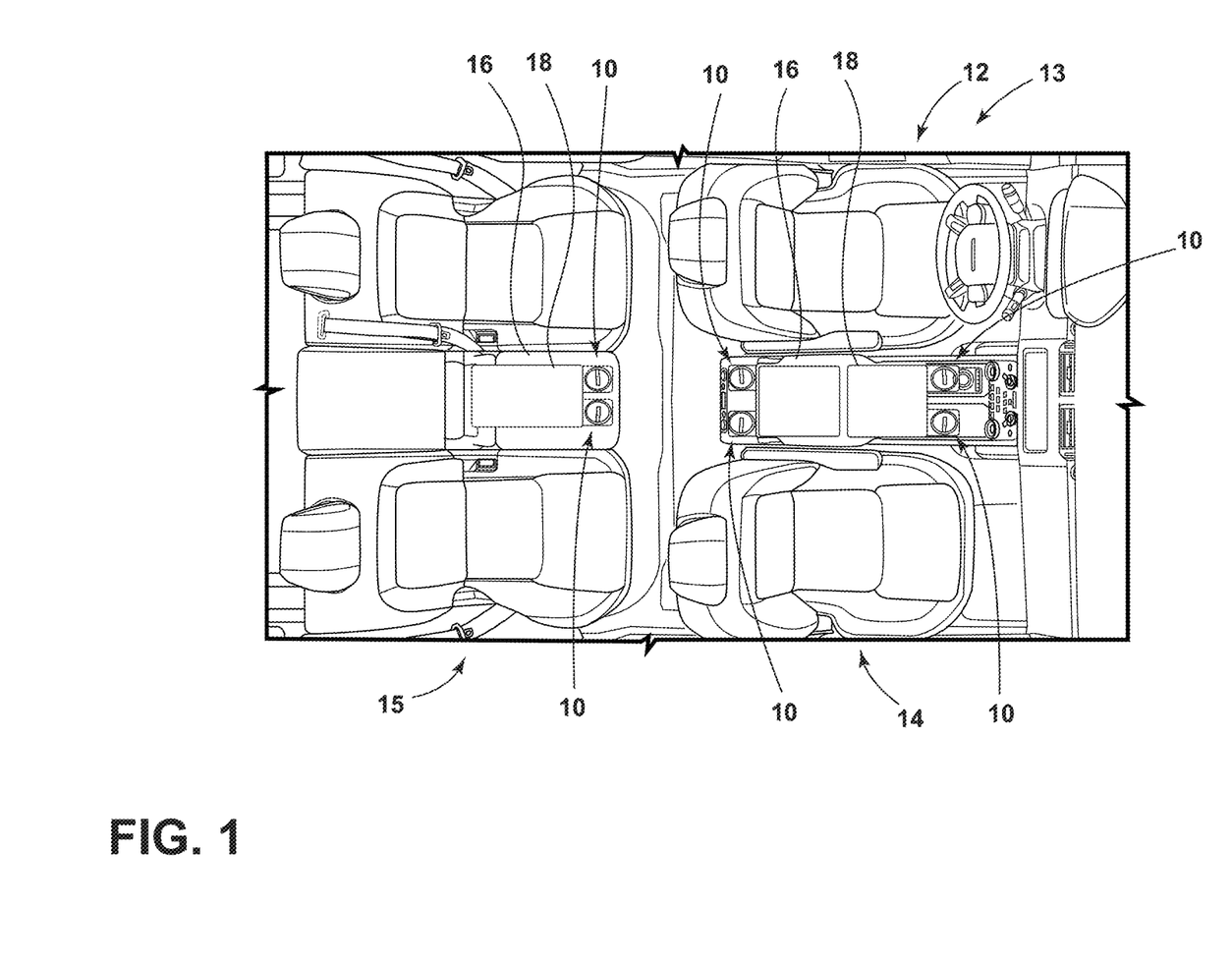
FIG. 1 is a top view of a passenger compartment of a vehicle having vehicle arm rests equipped with vehicle cup holder assemblies, according to one example.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIGS. 1-13, depicted is a vehicle interior 12 with a passenger compartment 13 that includes one or more bodies 16, each shown in the form of a vehicle arm rest 18 having retractable vehicle cup holder assembly 10. The vehicle cup holder assembly 10 includes a housing 24 wrapped around a corner periphery 19 of the vehicle arm rest 18, wherein the corner periphery 19 is configured to be located at an at least forward or rearward position of the vehicle arm rest 18. The housing 24 further comprises a side portion 26 and a front portion 28 that define an outside periphery 36 wherein the outside periphery 36 of the housing 24 generally corresponds with the corner periphery 19 of the vehicle arm rest 18 A support panel 38 is slideably coupled to the housing 24 and has a first member 40, a second member 42, and a corner 44 that is defined by the intersection of the first member 40 and the second member 42. The support panel 38 is operable between a recessed position and a deployed position, wherein the support panel 38 is configured to receive a container 66 in the deployed position, and wherein the first member 40, second member 42, and corner 44 of the support panel 38 generally correspond with the housing outside periphery 36 when the support panel 38 is in the recessed position. A lever arm 50 is coupled to the support panel 38 and is movable between a retracted position and an extended position, wherein the lever arm 50 is configured to support a base 68 of the container 66 in the extended position, and wherein the lever arm 50 is stored in the side portion of the housing 24 when in the retracted position. A finger support 60 is also coupled to the second member 42 of the support panel 38. The finger support 60 extends generally outward from the second member 42 of the support panel 38 and generally toward the housing 24 and is configured to laterally support the container 66.

Referring now to FIG. 1, the vehicle interior 12 includes a passenger compartment 13 therein contained within a vehicle body. The passenger compartment 13 may include a first seating row 14 and a second seating row 15. Fewer or more seating rows may be included in the passenger compartment 13 without departing from the teachings herein. The first seating row 14 may include a driver seat and a passenger seat. The driver and passenger seats may be separated by a front vehicle arm rest 18, which may be coupled to a center console, as illustrated in FIG. 1. The second seating row 15 may include rear passenger seats. The rear passenger seats of the second seating row 15 may include bucket seating or may be bench seating. As illustrated, the rear seating is bench that include a first rear passenger seat, a second rear passenger seat, and a third rear passenger seat. Further, the rear seating may include a vehicle arm rest 18 housed within the second passenger seat 15, or a rear center arm rest 18 that divides the first rear passenger seat and the second rear passenger seat. The vehicle cup holder assembly 10, as illustrated in FIG. 1, may be disposed on a front left corner, a front right corner, a rear left corner, and/or a rear right corner of the front vehicle arm rest 18 corner periphery 19. Additionally, as illustrated in FIG. 1, the vehicle cup holder assembly 10 may be disposed on a front left corner, and/or a front right corner of the rear vehicle arm rest 18 corner periphery 19. The vehicle cup holder assemblies 10 disposed on the front vehicle arm rest 18 and the vehicle cup holder assemblies 10 disposed on the rear vehicle arm rest 18 are contemplated to be substantially similar in structure in design, such that the description of one vehicle cup holder assembly 10 within this disclosure will implicitly describe features of the other, unless otherwise noted. In FIG. 1, the vehicle cup holder assemblies 10 are shown in a deployed and in-use configuration.

While the passenger compartment 13, as illustrated in FIG. 1, has the vehicle cup holder assemblies 10 disposed on the front vehicle arm rest 18 between the driver seat and the passenger seat of the front seating row 14, and has the vehicle cup holder assemblies 10 disposed on a rear vehicle arm rest 18 housed within the second rear passenger seat, it is contemplated that the vehicle cup holder assembly 10 may be positioned in any practicable location within the passenger compartment 13 of the vehicle interior 12 without departing from the teachings herein. The front vehicle arm rest 18 is illustrated as a top part of a front center console. However, the vehicle arm rest 18 may be any vehicle arm rest or support within the passenger compartment 13 without departing from the teachings herein.

In various examples, the passenger compartment 13 is a passenger compartment 13 that may be within the vehicle interior 12 of a sedan, a sport utility vehicle, a truck, a van, a crossover, and/or other styles of vehicle. The passenger compartment 13 may be within the vehicle interior 12 of a manually operated vehicle (e.g., with a human driver), a fully autonomous vehicle (e.g., no human driver), or a partially autonomous vehicle (e.g., may be operated with our without a human driver).

Figure 2:
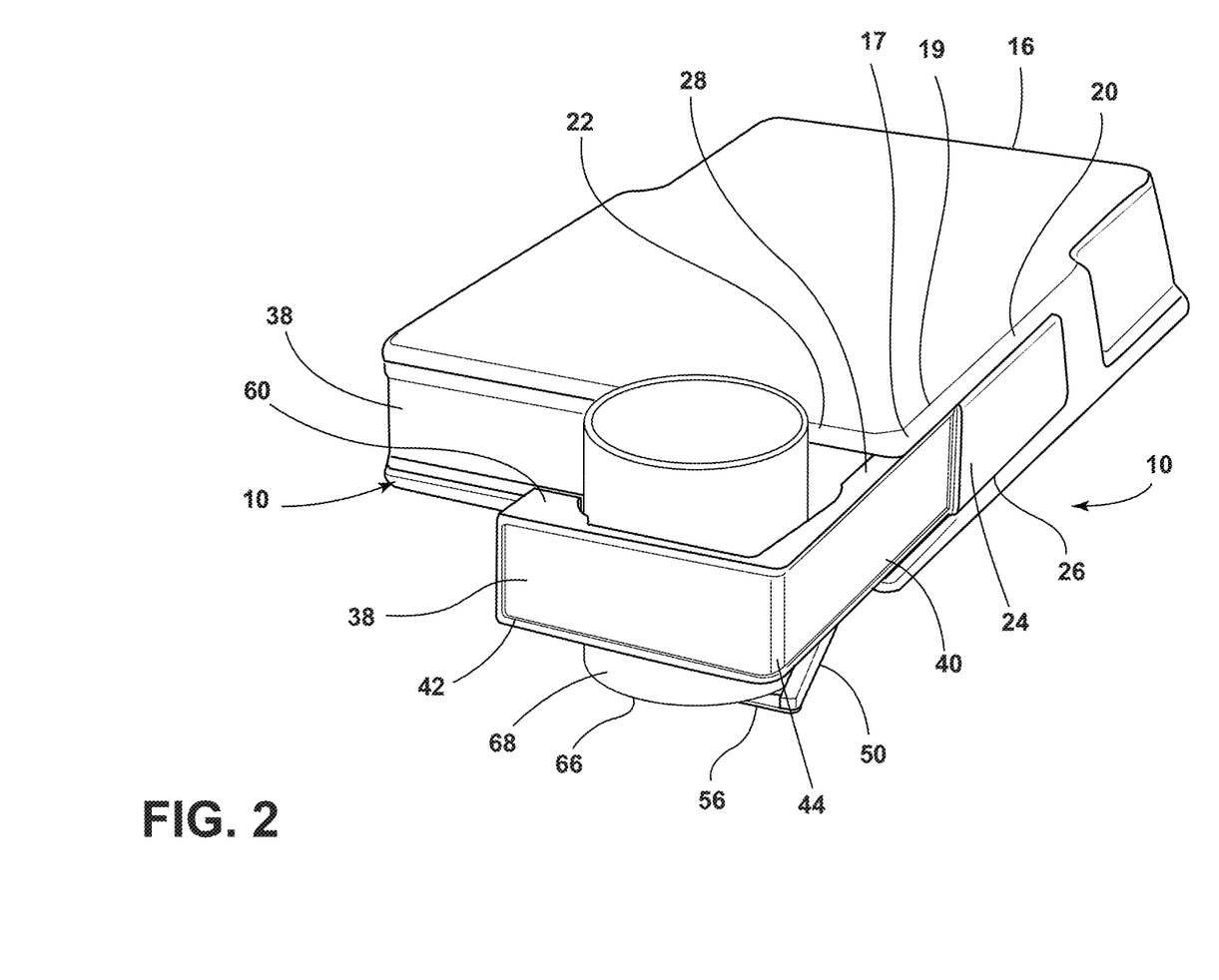
FIG. 2 is a top perspective view of a vehicle cup holder assembly extending from the arm rest in the in-use position, according to one example.
Figure 3:
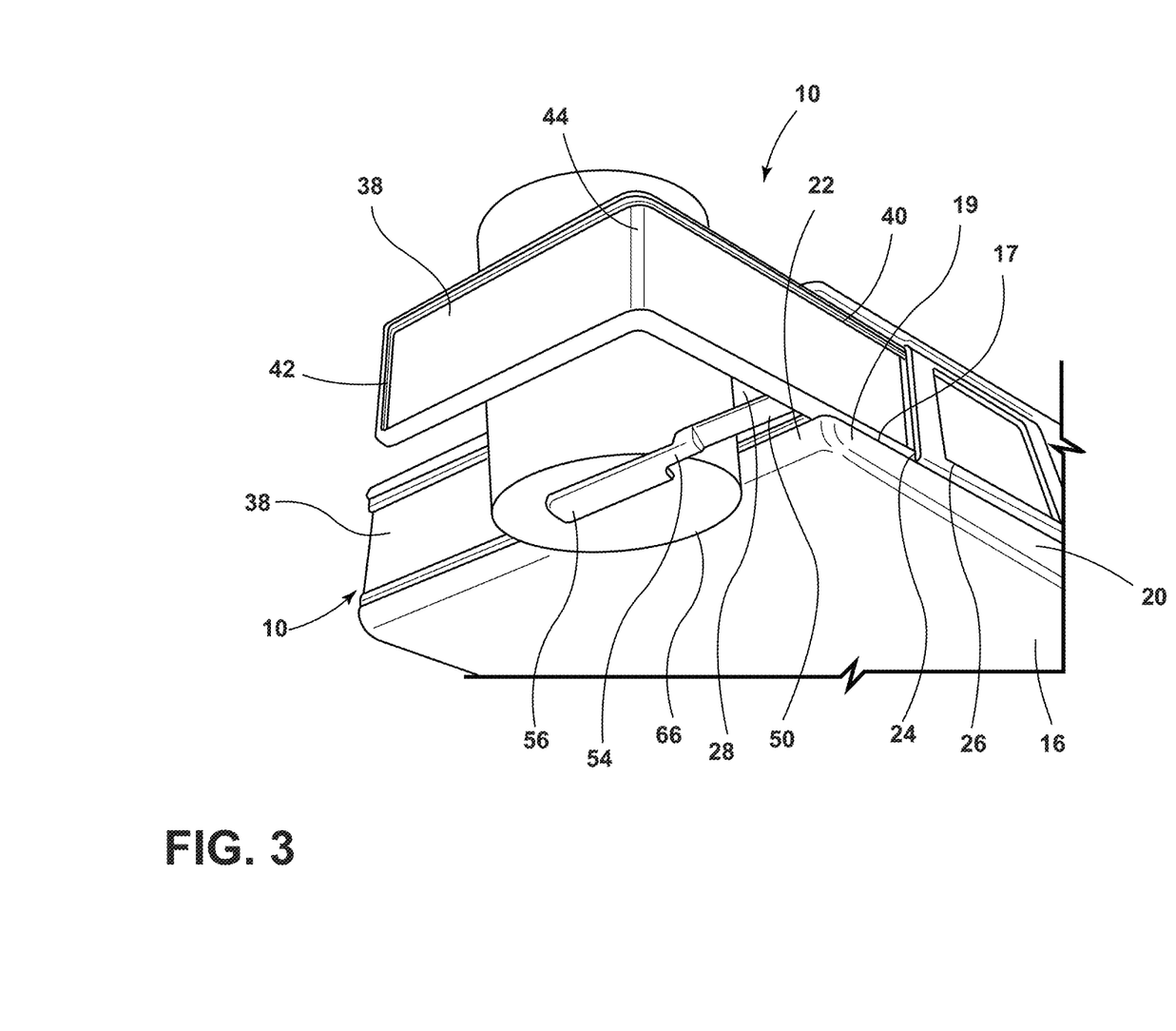
FIG. 3 is a bottom perspective view of the vehicle arm rest with the vehicle cup holder assembly in the in-use position, according to one example.
Figure 4:
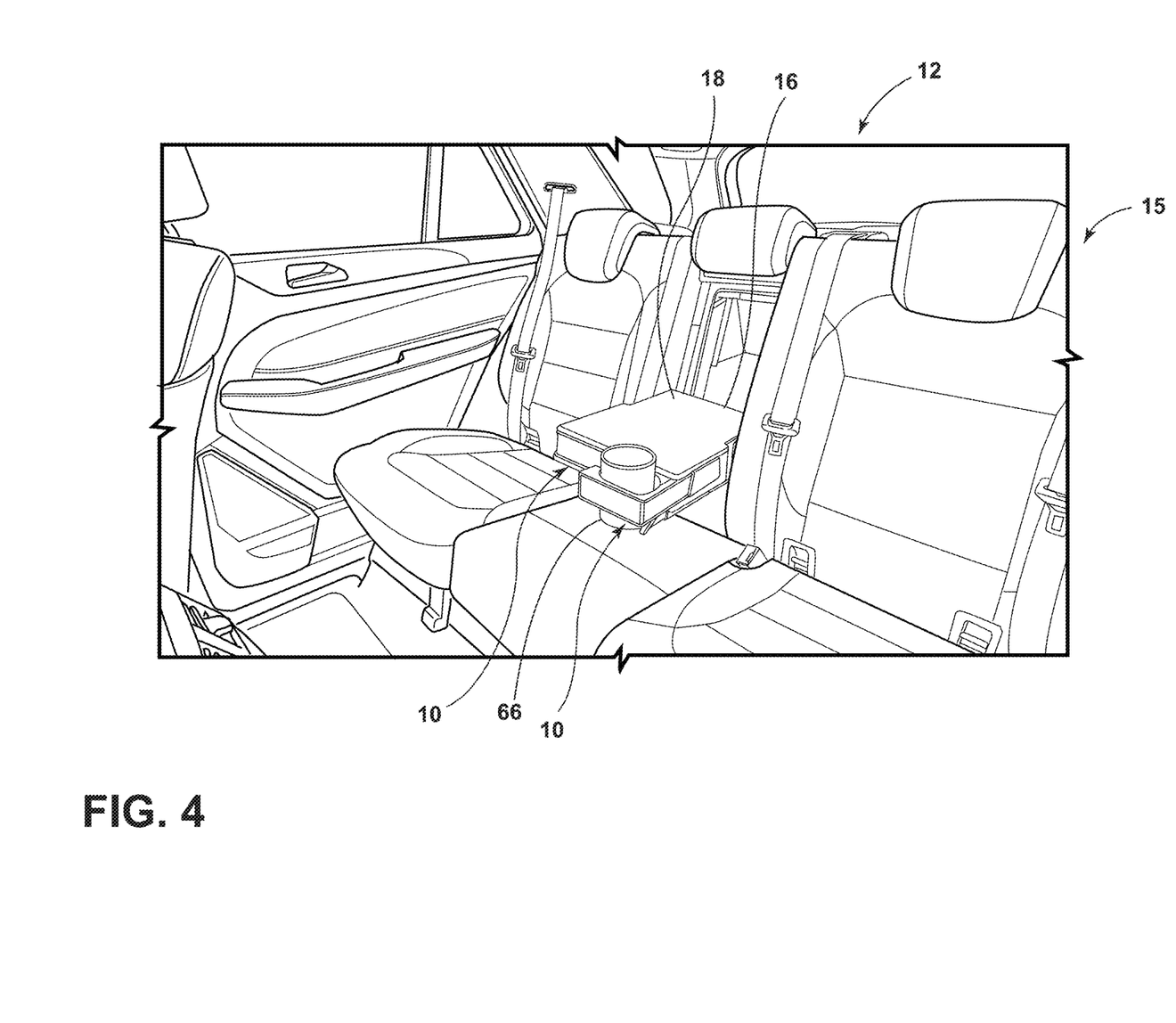
FIG. 4 is a perspective view of the passenger compartment with the vehicle arm rest and the vehicle cup holder assembly in the in-use position, according to one example.
Figure 5:
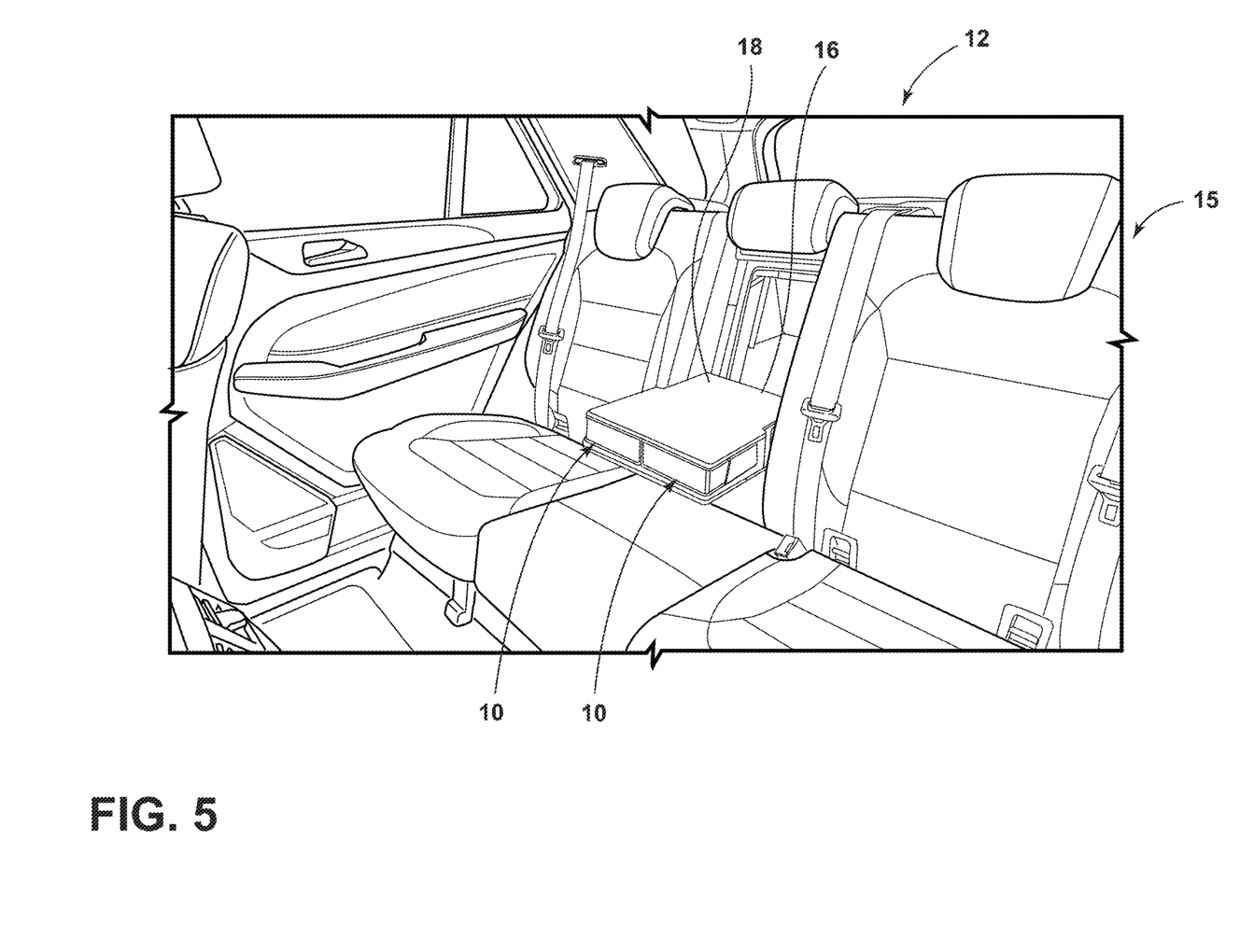
FIG. 5 is a perspective view of the passenger compartment with the vehicle arm rest and the vehicle cup holder assembly in the non-use position, according to one example.

Referring to FIGS. 1-5, the vehicle cup holder assembly 10 is built into and includes a body 16, shown and described herein as an arm rest, according to one embodiment. In some embodiments, the body 16 may define a first surface 20, a second surface 22, and a body corner periphery 17, wherein the corner periphery 17 is defined by the intersection of the first surface 20 and the second surface 22, and wherein the corner periphery 17 may generally define an L-shape. As illustrated in FIGS. 1, 4 and 5, the body 16 may be positioned in various positions throughout the passenger compartment 13. In some embodiments, the body 16 may be a vehicle center console, a vehicle arm rest, or any body that may allow for coupling to the housing 24. Additionally, or alternatively, the body 16 may be any practicable size, so long as the body 16 allows for coupling to the housing 24, as further discussed herein.

Figure 6:
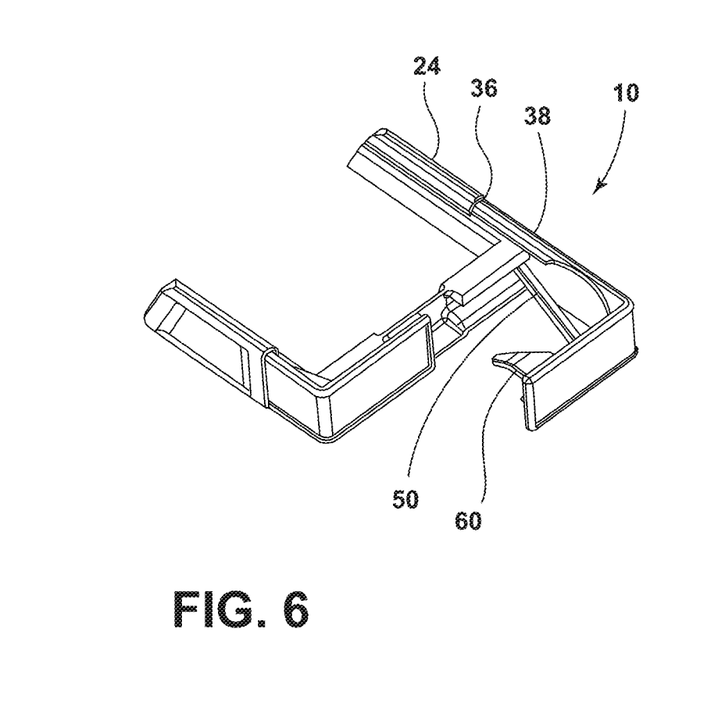
FIG. 6 is a perspective view of the vehicle cup holder assembly in the in-use position, according to one example.
Figure 7:
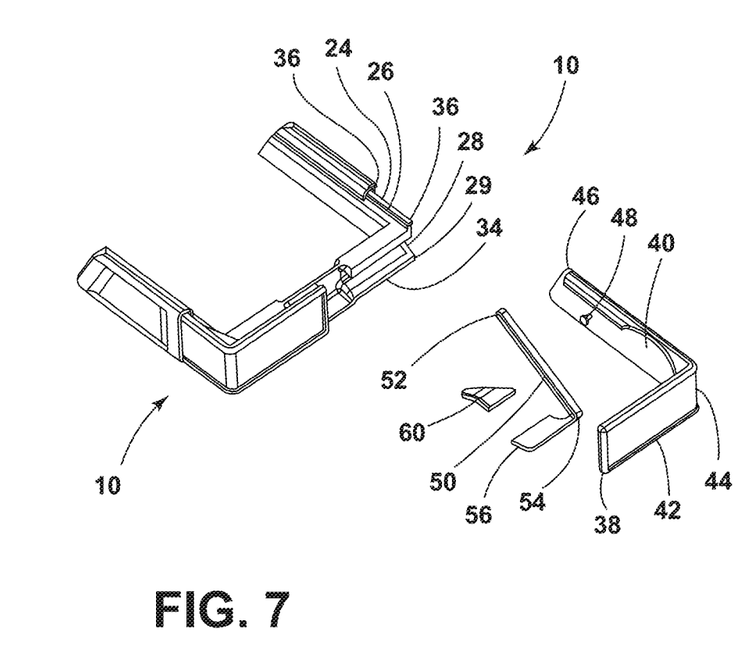
FIG. 7 is an exploded, perspective view of the vehicle cup holder assembly, according to one example.
Figure 8:
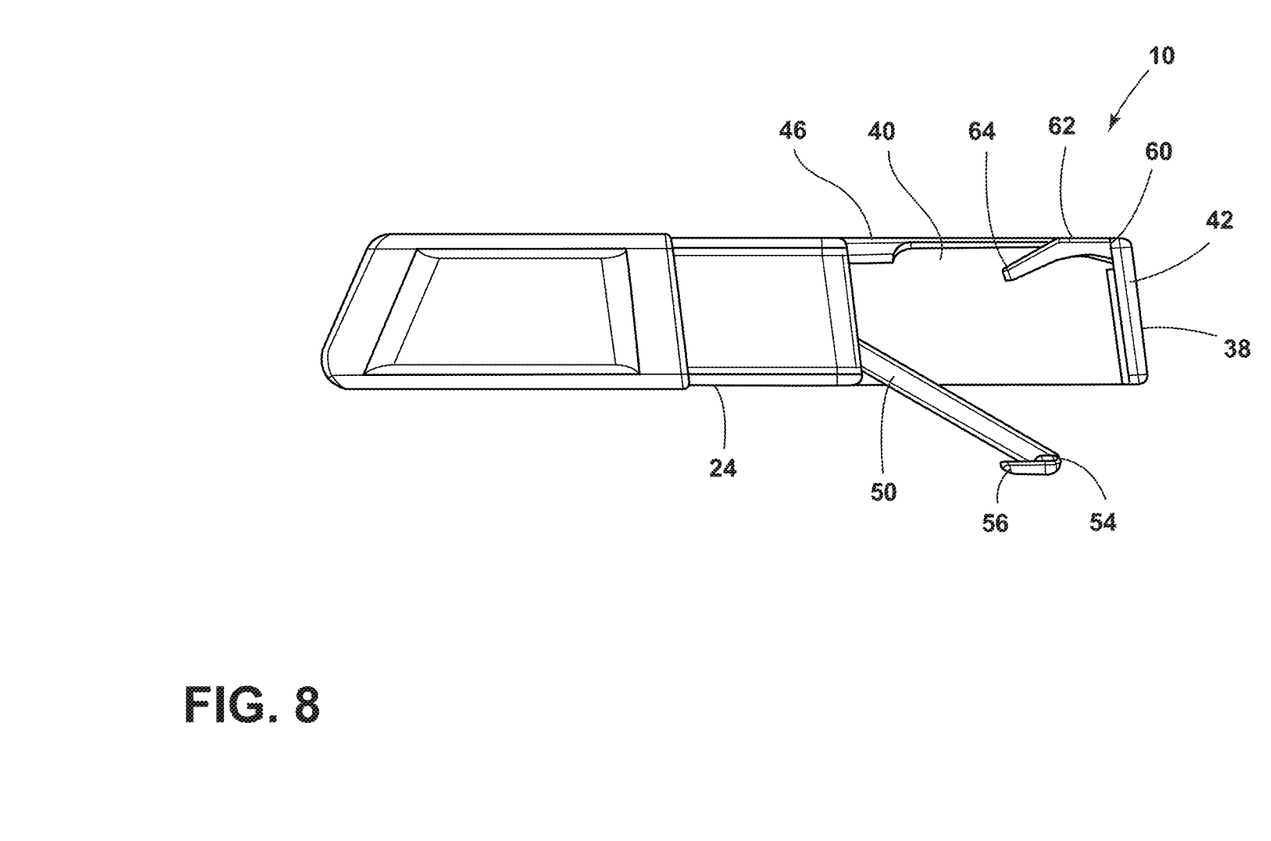
FIG. 8 is a side view of the vehicle cup holder assembly in the in-use position, according to one example.

Referring to FIGS. 2-13, the vehicle cup holder assembly 10 includes the housing 24 connected to the body. In some embodiments, the housing 24 may be coupled to the body 16. In various embodiments, the housing 24 may include a side portion 26, a front portion 28, and an outside periphery 36 defined by the side portion 26 and the front portion 28, wherein the side portion 26 is adjacent to the container 66 when the vehicle cup holder assembly 10 is in use, and wherein the front portion 28 is proximate to the container 66 when the vehicle cup holder assembly 10 is in use, as illustrated in FIGS. 2 and 3. Further, as illustrated in FIGS. 2 and 3, the housing 24 may extend along the first surface 20 and the second surface 22 of the body 16, such that the housing 24 outside periphery 36 corresponds with the corner periphery 17 of the body 16. The housing 24 may also generally define an L-shape. A U-shape may also be generally defined when the housing 24 is located on multiple corner peripheries 17 of the body 16. Alternatively, as illustrated in FIGS. 6 and 7, a continuous U-shape may be defined when the housing 24 is located on multiple corner peripheries 17 of the body 16, such that the housings 24 constitute a single member. It is contemplated that the housing 24 may have any practical shape that corresponds with the corner periphery 17 of the body 16. Additionally, or alternatively, it is contemplated that the housing 24 may have any practicable size, depending on the body 16 the housing 24 is coupled to in the passenger compartment 13 (FIG. 1). The housing 24 is configured to couple to the body 16, and the housing 24 is configured to support additional components of the vehicle cup holder assembly 10, as further discussed herein. Further, it is also contemplated that the housing 24 may be detachably coupled to the body 16.

Figure 9:
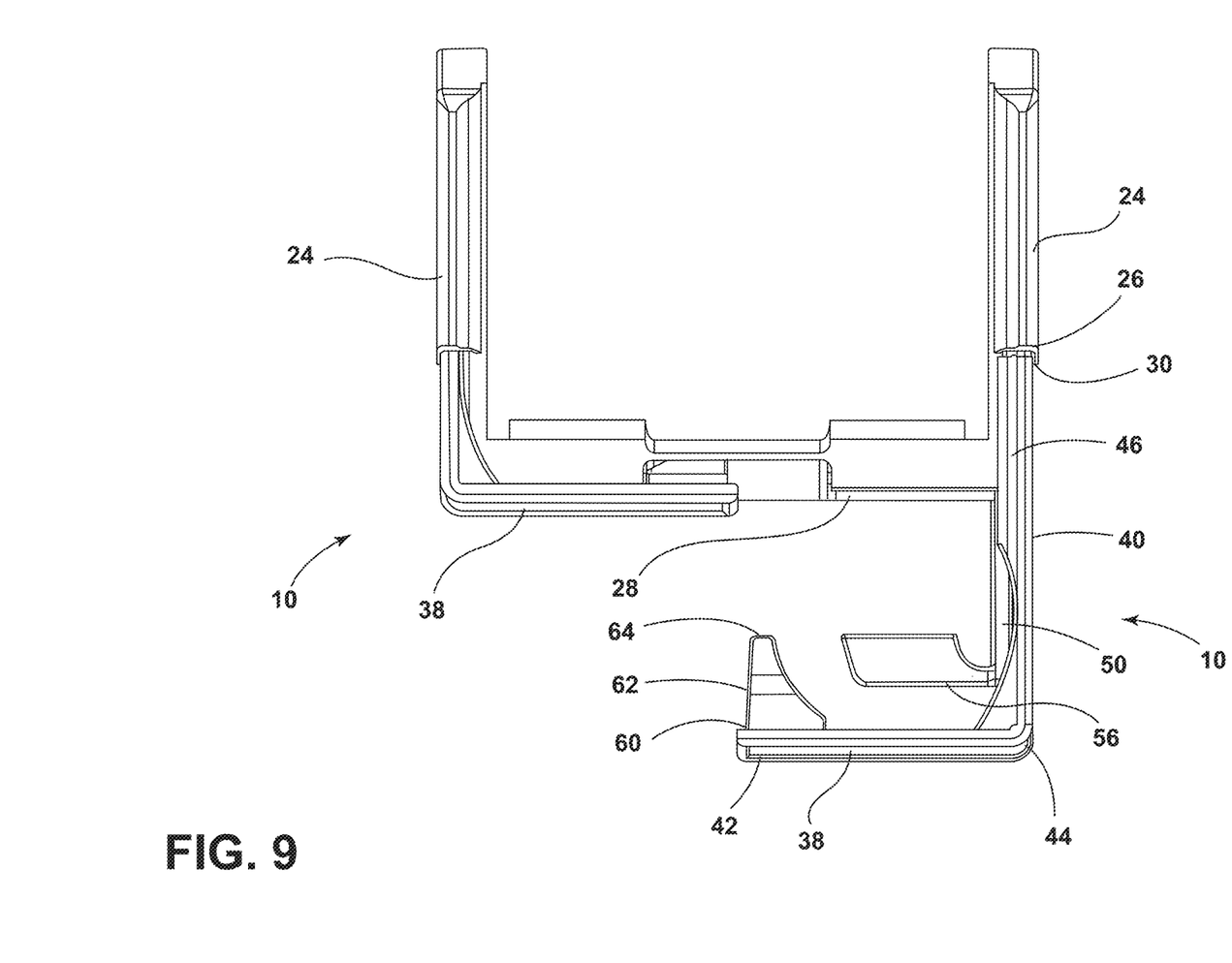
FIG. 9 is a top view of the vehicle cup holder assembly in the in-use position and the vehicle cup holder assembly in the non-use position, according to one example.
Figure 10:
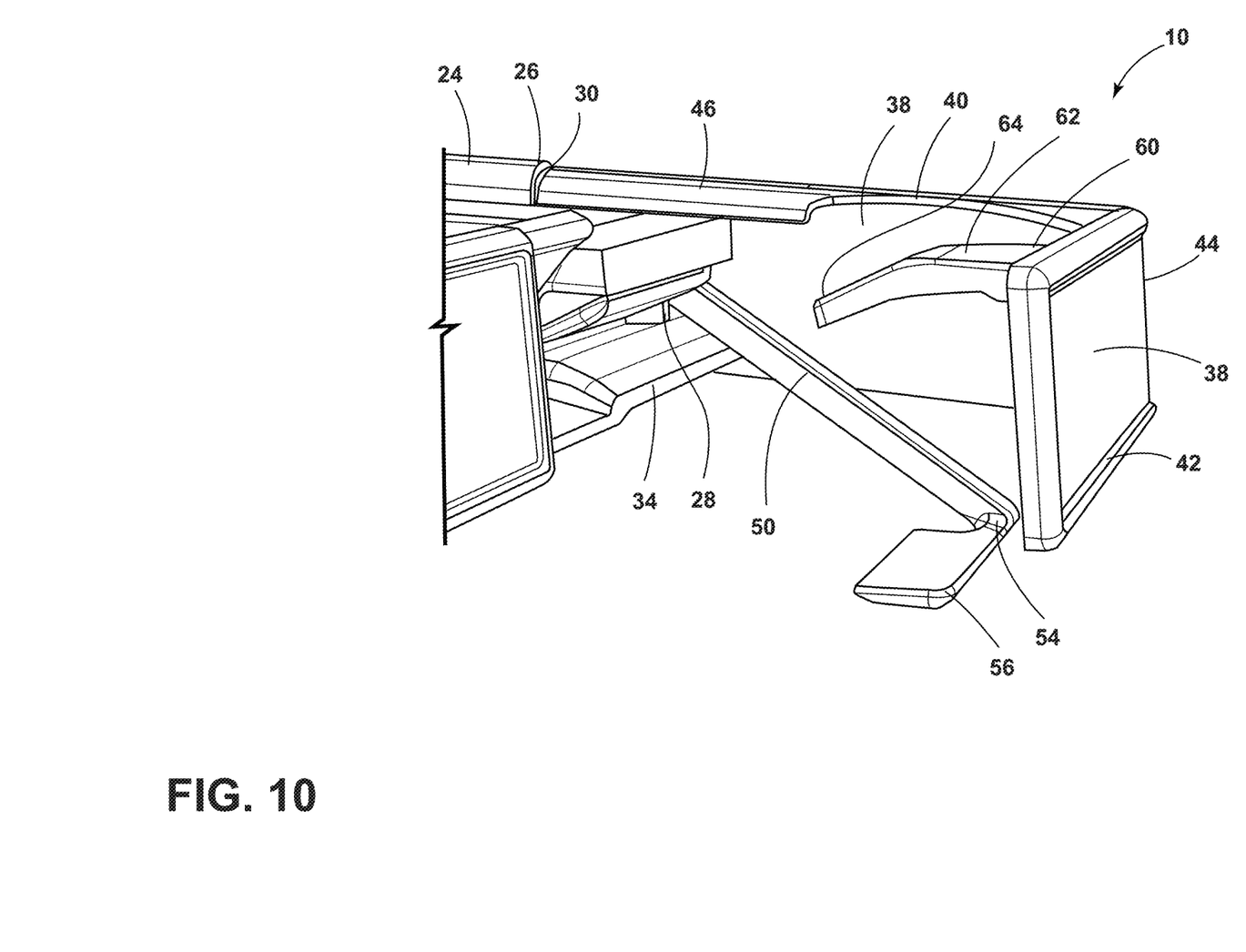
FIG. 10 is a front perspective view of the vehicle cup holder assembly in the in-use position, according to one example.
Figure 13:
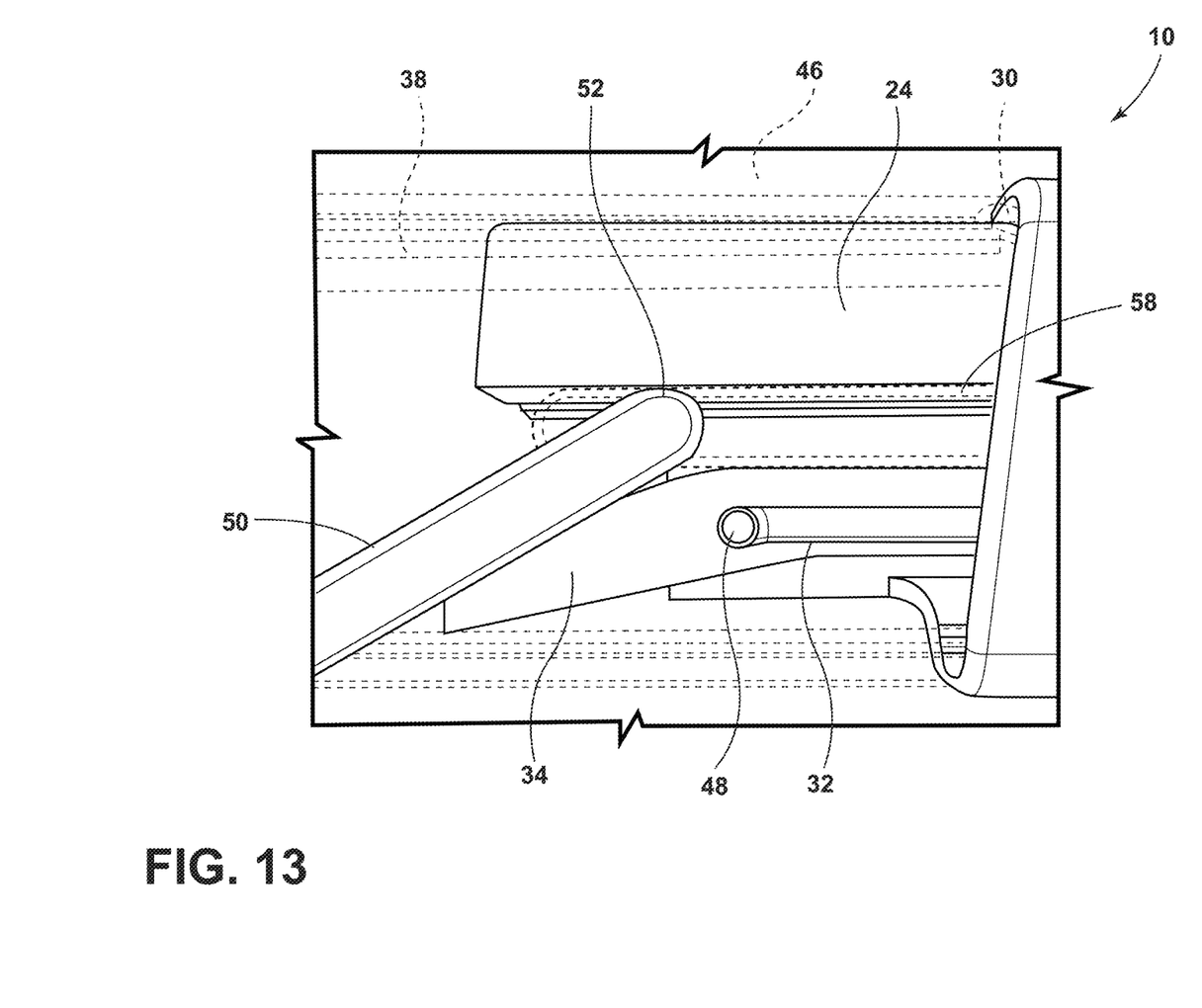
FIG. 13 is an enlarged view of a housing, a ramp, the lever arm, the slot, the cylindrical stop, and the engagement member of the vehicle cup holder assembly in the in-use position, according to one example.

Referring now to FIGS. 9, 10 and 13, the housing 24 may define a cam path 30 extending along the side portion 26 of the housing 24. In some embodiments, as illustrated in FIGS. 9 and 10, and 13, the cam path 30 may be an integrally formed aperture within the housing 24. In various embodiments, as illustrated in FIGS. 9, 10, and 13, the cam path 30 may be located within the side portion 26 of the housing 24. According to various aspects, the cam path 30 may be configured to contact an engagement member 46 of the support panel 38 and create a retaining force that assists in keeping the support panel 38 in either the deployed position or the recessed position, as further discussed herein.

Referring to FIG. 13, the housing 24 may define a slot 32. In some configurations, the slot 32 may be located within the side portion 26 of the housing 24. Further, the slot 32 may be integrally formed from the side portion 26 of the housing 24, as illustrated in FIG. 13 According to various aspects, the slot 32 is configured to contact a cylindrical stop 48, as further discussed herein.

Referring to FIGS. 6, 7, 10, and 13, the housing 24 may include a ramp 34. In various embodiments, the ramp 34 may extend generally outward from the front portion 28 of the housing 24. As illustrated in FIG. 13, the ramp 34 may be integrally formed within the housing 24. According to some embodiments, the ramp 34 is configured to support the lever arm 50 when the lever arm 50 is translated to an extended position and second rotational position, as further discussed herein.

Referring to FIGS. 2-13, the vehicle cup holder assembly 10 may include the support panel 38 coupled to the housing 24. In various embodiments, as illustrated in FIGS. 9, 10 and 13, the support panel 38 may be slideably coupled to the side portion of the housing 24, as further discussed herein. The support panel 38 may further include a first member 40 and a second member 42, wherein the first member 40 and the second member 42 intersect at a support panel corner 44, and wherein the first member 40 and second member 42 generally define an L-shape. In some embodiments, the first member 40 may be generally coplanar to the side portion 26 of the housing 24, and the second member 42 may be generally coplanar to the front portion 28 of the housing 24. According to various embodiments, the first member 40 may be a side wall, and the second member 42 may be a front wall, wherein the side wall and front wall generally define an L-shape. As illustrated in FIGS. 2-5, the support panel 38 is operable between a recessed position and a deployed position. In the recessed position, the second member 42 may be proximate the front portion 28 of the housing 24, and the corner 44 of the support panel 38 may be proximate a corner 29 of the outside periphery 36 of the housing 24. In the deployed position, the second member 42 may extend generally outward from the front portion 28 of the housing 24, such that a space is exists between the second member 42 and the front portion 28 of the housing 24. As illustrated in FIGS. 2, 3 and 10, the space between the second member 42 and the front portion 28 of the housing 24 generally defines an opening for the container 66.

Figure 11:
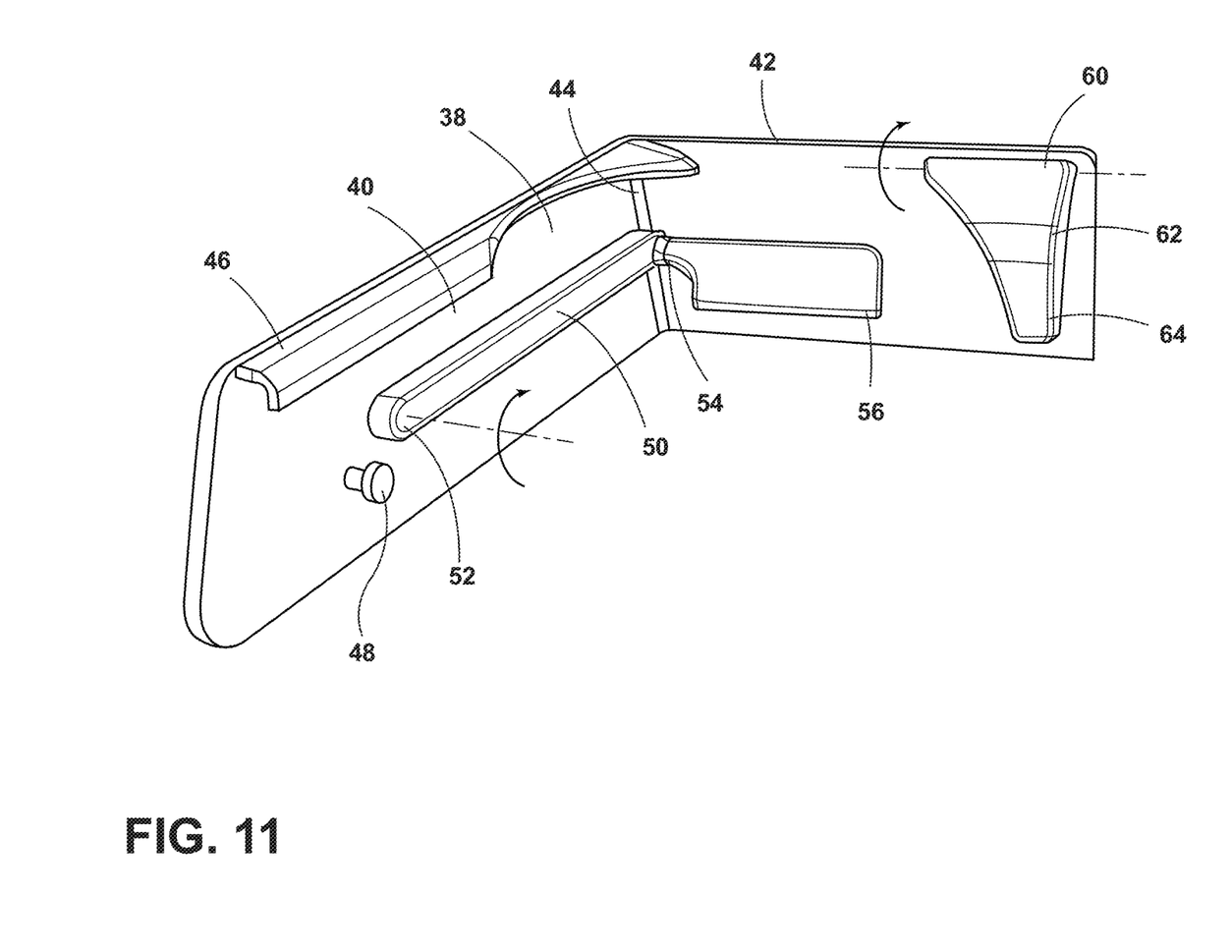
FIG. 11 is a perspective rear view of a support panel, a finger support, and a lever arm of the vehicle cup holder assembly of FIG. 10.
Figure 12:
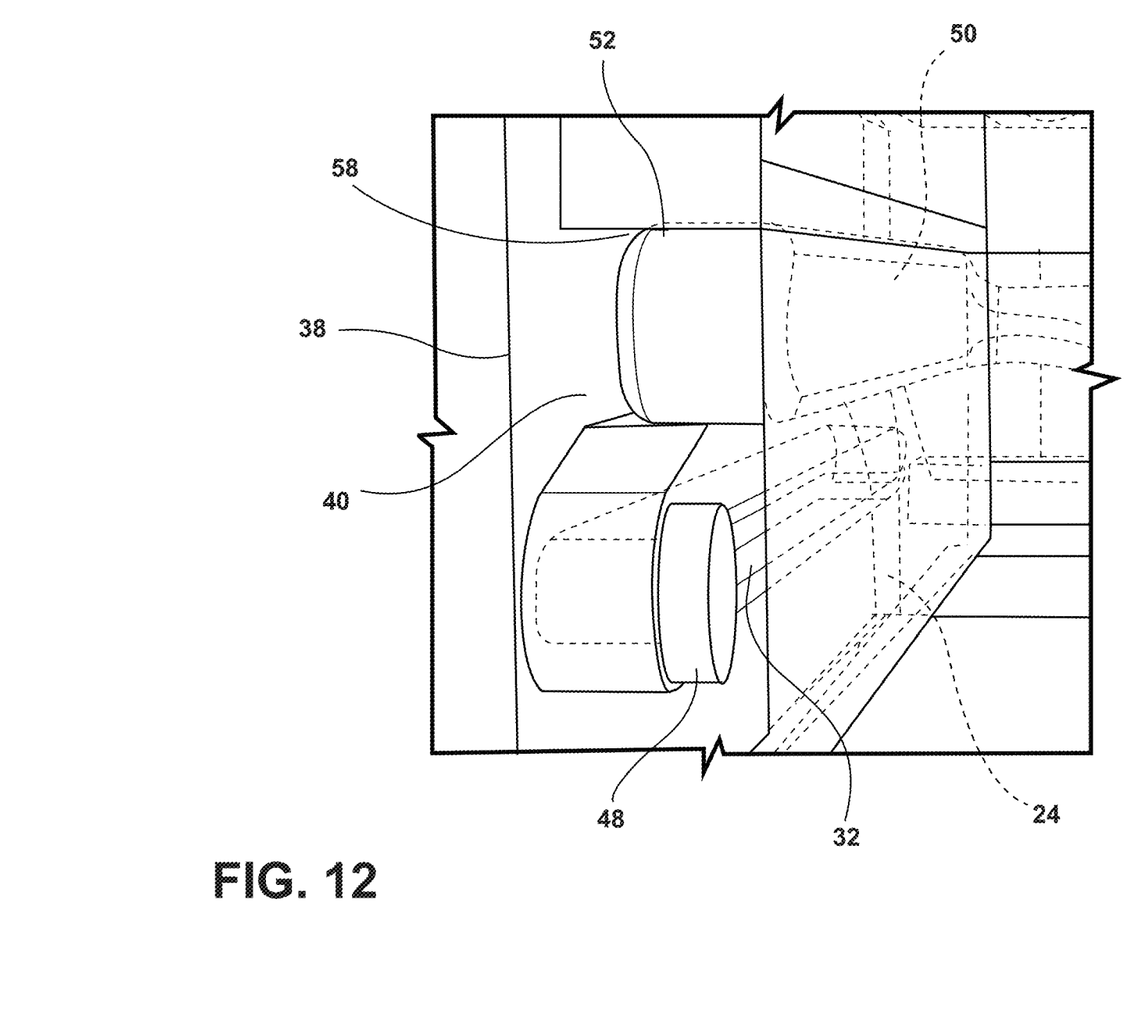
FIG. 12 is an enlarged, rear-partial view of a slot, an engagement member, a cylindrical stop, and the lever arm of the vehicle cup holder assembly in the non-use position, according to one example.

Referring to FIGS. 6-11 and 13, the support panel 38 may include the engagement member 46. In some embodiments, the engagement member 46 may be integrally formed from the support panel first member 40. In some embodiments, the engagement member 46 may extend generally outward from the support panel first member 40 and toward the housing 24 side portion 26 and then extend generally downward, as illustrated in FIGS. 10 and 11. The engagement member 46 is configured to contact the housing cam path 30, wherein the contact between the engagement member 46 and cam path 30 creates a retaining force that assists in keeping the support panel 38 in the deployed position and in the recessed position. It is contemplated that the engagement member 46 may be an independent member that is coupled to the support panel 38 first member 40. Further, it is also contemplated that the engagement member 46 may have any practicable shape, so long as the engagement member 46 may engage the cam path 30.

Referring to FIGS. 7, 11, and 13, the support panel 38 may include a cylindrical stop 48 extending outward from the first member 40 of the support panel 38. In various configurations, the cylindrical stop 48 may be integrally formed from the first member 40 of the support panel 38 and may extend generally outward from the first member 40 of the support panel 38 and toward the side portion 26 of the housing 24, as illustrated in the exploded view in FIG. 7. Further, the cylindrical stop 48 may contact the slot 32, wherein the contact between the cylindrical stop 48 and the slot 32 limits the translation of the support panel 38 when the support panel 38 is extended out to the deployed position, and when the support panel 38 is retracted to the recessed position. Further, the contact between the cylindrical stop 48 and the slot 32 provides a retaining force that at least partially keeps the support panel 38 in the deployed position.

Referring to FIGS. 2, 3 and 6-13, the vehicle cup holder assembly 10 may include the lever arm 50 coupled to the support panel 38. In various embodiments, as illustrated in FIG. 11, the lever arm 50 may be rotationally coupled to the support panel 38 first member 40, wherein the first member 40 is a side wall, as illustrated in FIG. 11. Further, in some configurations, the lever arm 50 may be rotationally spring-loaded and rotationally coupled to the support panel 38 first member 40. In some embodiments, the lever arm 50 has a rear element 52 and a front element 54, wherein the rear element 52 may have a curvature that is generally semi-circular and is configured to contact the housing 24, and wherein the front element 54 may be configured to contact the container 66. In various embodiments, the lever arm 50 may be operable to move between a stored position in a lever arm channel 58 within the side portion 26 of the housing 24, to an extended position extending outside of the front portion 28 of the housing 24. Movement of the support panel 38 from the recessed position to the deployed position may move the lever arm 50 from the retracted to extended position. Further, in various embodiments, the lever arm 50, when translated to the extended position, may rotate generally downward from a first rotational position to a second rotational position. As illustrated in FIGS. 10 and 13, the lever arm 50 may contact the ramp 34 when translated downward to the second rotational position, such that the contact between the lever arm 50 and the ramp 34 limits the rotational travel of the lever arm 50 when in the extended position. In some embodiments, the rear end 52 of the lever arm 50 may engage the housing 24 when the lever arm 50 is translated to the extended position and second rotational position. Further, the engagement between the lever arm 50 in the second rotational position and the housing 24 may create a cam interface that generates a retaining force that assists in keeping the lever arm 50 in the extended position. Further, it is also contemplated that the lever arm 50 may have any practicable shape, so long as the lever arm 50 may be operable between a retracted and extended position.

Referring to FIGS. 3 and 7-11, the vehicle cup holder assembly 10 may include a container support 56 coupled to the lever arm 50. In various embodiments, the container support 56 may extend generally outward from the lever arm 50 and extend generally parallel to the second member 42 of the support panel 38. In some embodiments, as illustrated in FIGS. 9-11, the container support 56 may be integrally formed from the front element 54 of the lever arm 50. As illustrated in FIG. 3, the container support 56 is configured to contact the base 68 of the container 66 and vertically support the container 66 when the lever arm 50 is in the extended position.

Referring now to FIGS. 2 and 6-11, the vehicle cup holder assembly 10 may include the finger support 60. As illustrated in FIG. 10, the finger support 60 may be coupled to the second member 42 of the support panel 38. In some embodiments, the finger support 60 may be rotationally coupled to the support panel 38 second member 42, wherein the second member 42 is a front wall, as illustrated in FIG. 11. Further still, the finger support 60 may be rotationally spring-loaded and rotationally coupled to the support panel 38 second member 42. As shown in FIG. 10, the finger support 60 may extend generally outward from the support panel 38 second member 42 and toward the front portion 38 of the housing 24. Further, the finger support 60 may define a top surface 62 that faces generally upward and is proximate the support panel 38 second member 42, and an angled surface 64 that faces generally upward and rearward and is distal the support panel 38 second member 42, as illustrated in FIG. 10. In various embodiments, the finger support 60 may be pivotably operable between an inactive position and an active position, wherein the finger support 60 is pointed generally downward and in contact with the housing 24 front portion 28 in the inactive position, and wherein the finger support 60 is spaced away from the front portion 28 of the housing 24 and pointed generally toward the front portion 28 of the housing 28 in the active position, as illustrated in FIG. 10. Movement of the finger support 60 from the active position to the inactive position may occur when a force is applied to the top surface 62 or angled surface 64 of the finger support 60. In some embodiments, the force is applied when the angled surface 64 contacts the front portion 28 of the housing 24 when the support panel 38 is translated to the recessed position. As illustrated in FIG. 2, the finger support 60 is configured to laterally support the container 66 when in the active position. It is contemplated that the finger support 60 may have any practicable shape, so long as the finger support 60 may laterally support the container 66.

In operation of an exemplary embodiment of the vehicle cup holder assembly 10, the vehicle cup holder assembly 10 may initially be in a non-use position. In the non-use position, the support panel 38 will be in the retracted position, such that the support panel first member 40 is proximate the housing side portion 26, and the support panel second member 42 extends along the housing front portion 28. Further, in the non-use position, the lever arm 50 is in the retracted position, wherein the lever arm 50 is stored within the lever arm channel 58 in the side portion 26 of the housing 24, and wherein the lever arm 50 is in the first rotational position. Further still, the finger support 60 will be folded down in the inactive position, wherein the finger support 60 is pointed generally downward, and wherein the finger support top surface 62 is in contact with the front portion 28 of the housing 24. The non-use position of two vehicle cup holder assemblies 10 can be illustrated in FIG. 5, and a view of one vehicle cup holder assembly in a non-use position may be viewed in FIGS. 2-4.

A user desiring to use the vehicle cup holder assembly 10 may grab the support panel 38 and move the support panel 38 from the recessed position to the deployed position. As the support panel 38 translates outwards from the housing 24, the lever arm 50 moves with the support panel 38 from the stored position to the extended position. Upon reaching the extended position, the lever arm 50 pivots downward, unencumbered by the lever arm channel 58, from the first rotational position to the second rotational position and contacts the ramp 34, which maintains the lever arm 50 in the second rotational position. Additionally, as the support panel 38 moves from the recessed position to the deployed position, the finger support 60 pivots from the inactive position to the active position.

Next, the user may place their container 66 into the opening generally defined by the finger support 60, and the first member 40 and second member 42 of the support panel 38. The base 68 of the container 66 rests on the container support 56 of the lever arm 50. The weight of the container 66 upon the container support 56 of the lever arm 50 cantilevers above the ramp 34, which acts as a fulcrum, such that the semi-circular rear element 52 contacts the housing 24 and provides a retaining force that assists in supporting the lever arm 50 and assists in keeping the vehicle cup holder assembly 10 in an in-use position. Further, the contact between the engagement member 46 and the cam path 30 provides a retaining force sufficient to minimize the potential of the vehicle cup holder assembly 10 rebounding back from the in-use position when the user is translating the support panel 38 out to the deployed position. Likewise, the contact between the cylindrical stop 48 and the slot 32 provides a retaining force that at least partially keeps the vehicle cup holder assembly 10 from rebounding back from the in-use position.

The user may remove the container 66 out of the defined opening, and move the vehicle cup holder assembly 10 back to a non-use position. In doing so, the user applies an inwardly directed force upon the support panel 38 which causes the support panel 38 to translate towards the recessed position. As the support panel 38 translates towards the recessed position, the lever arm 50 rotates upward from the second rotational position to the first rotational position, and translates from the extended position to the stored position within the lever arm channel 58 in the housing 24. Further, as the support panel 38 translates to the recessed position, the finger support 60 rotates to the non-use position due to the contact between the angled surface 64 of the finger support 60 and the housing 24, which creates a downward force as the support panel 38 translates to the recessed position. When the support panel 38 reaches the recessed position, the support panel corner 44, first member 40, and second member 42 generally corresponds with the housing outside periphery 36, which in turn, corresponds with the corner periphery 17 of the body 16.

Use of the presently disclosed device may provide for a variety of advantages. For example, the housing 24 may be coupled to the corner periphery 19 of the vehicle arm rest 18, such that the components of the vehicle cup holder assembly 10 are housed around the corner periphery 19 of the vehicle arm rest 18 when the vehicle cup holder assembly 10 is in the non-use position, thus, allowing for a minimized footprint of the vehicle cup holder assembly 10 and an increase in usable space that would otherwise be taken up by a conventional cup holder assembly in the vehicle arm rest 18. This reduced footprint may also allow for the additional placement of vehicle cup holder assemblies 10 around the corner periphery 19 of the vehicle arm rest 18, as illustrated in FIGS. 1-5. Thus, the vehicle cup holder assembly 10 described herein provides advantages through a reduced assembly footprint and the opportunity for additional placement of the vehicle cup holder assembly 10 in the passenger compartment 13. Further, it is contemplated that the vehicle cup holder assembly 10 could also be placed on the corner periphery 17 of other bodies 16 in a passenger compartment 13, such that placement of a vehicle cup holder assembly 10 on other bodies 16 would likewise reduce space normally taken up by conventional cup holder assemblies that could be installed on like bodies 16, and further allow for increased placement of vehicle cup holder assemblies 10 in a vehicle.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A vehicle cup holder assembly comprising:
   a body;
   a housing wrapped around a corner periphery of the body, wherein the housing has a side portion and a front portion;
   a support panel slideably coupled to the housing, wherein the support panel has a first member and a second member, and wherein the support panel is operable between a recessed position and a deployed position, and wherein the support panel is configured to receive a container when in the deployed position; and
   a lever arm coupled to the support panel, wherein the support panel is movable between a retracted position and an extended position, wherein the lever arm is configured to support a base of the container in the extended position, and wherein the lever arm is stored within the side portion of the housing when in the retracted position.

2. The vehicle cup holder assembly of claim 1, further comprising a finger support rotationally coupled to the support panel second member, wherein the finger support is configured to extend generally outward from the support panel second member and generally toward the front portion of the housing, and wherein the finger support is configured to laterally support the container.

3. The vehicle cup holder assembly of claim 2, wherein the finger support has a top surface and an angled surface, wherein the top surface is proximate the second member of the support panel and the angled surface is distal the second member of the support panel, and wherein the angled surface of the finger support is configured to contact the front portion of the housing when the support panel is translated to the recessed position.

4. The vehicle cup holder assembly of claim 1, wherein the lever arm is rotationally coupled to the support panel.

5. The vehicle cup holder assembly of claim 1, further comprising a ramp integrally formed in the housing and extending generally outward from the front portion of the housing.

6. The vehicle cup holder assembly of claim 5, wherein the lever arm is configured to rotate generally downward from a first rotational position to a second rotational position when translated to the extended position, and wherein the lever arm is configured to be in contact with the ramp when in the second rotational position.

7. The vehicle cup holder assembly of claim 6, further comprising a rear element of the lever arm, wherein the rear element is semi-circular, and wherein the rear element is configured to form a contact with the housing when the lever arm is in the second rotational position, and wherein the contact provides a retaining force that at least partially keeps the support panel in the deployed position.

8. The vehicle cup holder assembly of claim 1, wherein the outside periphery of the housing corresponds with the corner periphery of the body.

9. The vehicle cup holder assembly of claim 8, wherein an intersection between the first member and second member of the support panel defines a corner, and wherein the corner, first member, and second member of the support panel generally correspond with the housing outside periphery when the support panel is in the recessed position.

10. The vehicle cup holder assembly of claim 1, wherein the corner periphery of the body is a corner periphery of a vehicle arm rest.

11. The vehicle cup holder assembly of claim 10, wherein the corner periphery of the vehicle arm rest is configured to be located at an at least forward or rearward position of the vehicle arm rest.

12. The vehicle cup holder assembly of claim 1, wherein the housing further comprises an integrally formed slot, and wherein the support panel further comprises an integrally formed cylindrical stop that extends generally outward from the support panel first member and is configured to form a contact with the integrally formed slot and slide along the integrally formed slot when the support panel translates to the deployed position.

13. The vehicle cup holder assembly of claim 12, wherein the contact between the integrally formed slot and the cylindrical stop provides a retaining force that at least partially keeps the support panel in the deployed position.

14. The vehicle cup holder assembly of claim 1, further comprising a cam path defined within the side portion of the housing and an engagement member integrally formed from the first member of the support panel, wherein the engagement member is configured to form a contact with and slide along the cam path, and wherein the contact between the engagement member and cam path provides a retaining force that at least partially keeps the support panel in the deployed position.

15. The vehicle cup holder assembly of claim 1, wherein the support panel first member and second member generally define an L-shape.

16. A vehicle cup holder assembly comprising:
a vehicle arm rest;
a housing wrapped around a corner periphery of the vehicle arm rest, wherein the corner periphery is configured to be located at an at least forward or rearward position of the vehicle arm rest, and wherein the housing has a side portion and a front portion that define an outside periphery, and wherein the outside periphery generally corresponds with the corner periphery of the vehicle arm rest;
a support panel slideably coupled to the housing, comprising a first member, a second member, and a corner defined by the intersection of the first member and the second member, and wherein the support panel is operable between a recessed position and a deployed position, and wherein the support panel is configured to receive a container when in the deployed position, and wherein the support panel first member, second member, and corner generally correspond with the housing outside periphery when in the recessed position;
a lever arm coupled to the support panel, wherein the lever arm has a retracted position and an extended position, and wherein the lever arm is configured to support a base of the container in the extended position, and wherein the lever arm is stored within the side portion of the housing in the retracted position; and
a finger support coupled to the second member of the support panel, wherein the finger support extends generally outward from the second member of the support panel and generally toward the housing, and wherein the finger support is configured to laterally support the container.

17. The vehicle cup holder assembly of claim 16, further comprising a ramp integrally formed in the housing and extending generally outward from the front portion of the housing, wherein the ramp is configured to be in contact with the lever arm when the lever arm is in the extended position.

18. The vehicle cup holder assembly of claim 17, further comprising a rear element of the lever arm, wherein the rear element is semi-circular, and wherein the rear element is configured to form a contact with the housing when the lever arm is in the extended position, and wherein the contact provides a retaining force that at least partially keeps the support panel in the deployed position.

19. The vehicle cup holder assembly of claim 16, wherein the housing further comprises an integrally formed slot, and wherein the support panel further comprises an integrally formed cylindrical stop that extends generally outward from the first member of the support panel and is configured to form a contact with the integrally formed slot and slide along the integrally formed slot when the support panel transitions to the deployed position.

20. The vehicle cup holder assembly of claim 16, further comprising a cam path defined within the side portion of the housing and an engagement member integrally formed from the first member of the support panel, wherein the engagement member is configured to form a contact and slide along the cam path when the support panel is translated out to the deployed position, and wherein the contact provides a retaining force that at least partially keeps the support panel in the deployed position.

* * * * *